(12) United States Patent
Jambor et al.

(10) Patent No.: US 6,296,295 B1
(45) Date of Patent: Oct. 2, 2001

(54) MOTOR VEHICLE WITH A CONVERTIBLE TOP

(75) Inventors: Arno Jambor, Vaihingen; Oliver Wagner, Filderstadt, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/328,482

(22) Filed: Jun. 9, 1999

(30) Foreign Application Priority Data

Jun. 9, 1998 (DE) ................................. 198 25 651

(51) Int. Cl.[7] ................................. B60J 1/18; B60J 1/08
(52) U.S. Cl. ........................ 296/146.14; 280/756
(58) Field of Search ............... 296/180.1, 146.14, 296/147, 85, 107.07, 218; 280/756

(56) References Cited

U.S. PATENT DOCUMENTS

| | | | |
|---|---|---|---|
| 2,782,069 | * | 2/1957 | Storch ................................ 296/85 X |
| 3,536,354 | * | 10/1970 | Ingram ....................... 296/107.07 X |
| 5,112,100 | * | 5/1992 | Murkett et al. ................... 296/218 X |
| 5,195,799 | * | 3/1993 | Gotz et al. ........................ 296/180.1 |
| 5,219,201 | * | 6/1993 | Gotz et al. ......................... 296/85 X |
| 5,558,388 | * | 9/1996 | Furst et al. ...................... 296/108 X |
| 5,810,424 | * | 9/1998 | Kuttner et al. ................... 296/180.1 |
| 5,988,729 | * | 11/1999 | Klein ................................ 296/107.15 |

FOREIGN PATENT DOCUMENTS

| | | |
|---|---|---|
| 34 29 880 C2 | 2/1986 | (DE) . |
| 37 38 500 A1 | 12/1988 | (DE) . |
| 41 28 460 C2 | 3/1993 | (DE) . |
| 43 00 924 C2 | 7/1994 | (DE) . |
| 144665 * | 11/1920 | (GB) ...................................... 296/85 |

* cited by examiner

*Primary Examiner*—Dennis H. Pedder
(74) *Attorney, Agent, or Firm*—Crowell & Moring LLP

(57) ABSTRACT

A motor vehicle having a convertible top and whose interior is shielded from drafts by means of a rearward protective wall for extensive protection of the occupants. The interior of the motor vehicle is largely enclosed around a circumference along upper edges of the side walls by the windshield, the side windows and the protective wall. A detachable roof part encloses the interior. As a result, minimum expenditures are required to place the roof part in an open or closed position.

12 Claims, 2 Drawing Sheets

MOTOR VEHICLE WITH A CONVERTIBLE TOP

BACKGROUND AND SUMMARY OF THE INVENTION

This application claims the priority of German Patent Application No. 198 25 651.5, filed Jun. 9, 1998, the disclosure of which is expressly incorporated by reference herein.

The present invention relates to a motor vehicle having a convertible top.

A motor vehicle of this type is known from German Patent Document DE 37 38 500 A1. This motor vehicle can be provided with a protective wall by which the occupants of the motor vehicle are largely shielded from drafts when the convertible top is retracted. The protective wall consists of a transparent plastic covering which comprises several rigid plate sections connected by way of film hinges and which can be mounted behind the front seats of the motor vehicle in front of a rollover bar. A disadvantage in this case is that the mounting and the removal of the protective wall are relatively time-consuming. In addition, when the protective wall is spread out, the convertible top which is carried along in the motor vehicle cannot be closed without problems.

Furthermore, from German Patent Document DE 43 00 924 C2, a removable roof part for passenger cars with a retractable top is disclosed as a one-piece, fixed roof shell. This roof part can be locked in place in the front of the vehicle with the windshield frame and in the rear of the vehicle with a rollover bar forming the B-column area of the motor vehicle. The roof part ends on its rearward edge side with a wind deflector. However, this roof part does not provide a rearward shielding against air currents penetrating from the rear into the occupant compartment for the purpose of preventing drafts. It is also disclosed to use the roof part as an alternative to the top, which is carried along. As a result, changing between the roof part and the convertible top requires considerable expenditures.

It is an object of the present invention to further develop a motor vehicle having a convertible top that can be changed at low expenditures from an open position that shields the occupants from drafts into a closed position and vice-versa.

This object is achieved according to the present invention by a protective wall that is advantageously used as a rear wall portion of the convertible top. During the closing of the convertible top, the protective wall can remain in a shielding protective position. Together, the roof portion and the protective wall form the convertible top or the roof structure. As a result, the roof portion can be designed as a relatively flat, stiff roof shell that can be stored in a correspondingly space-saving manner. Because of the double utilization of the protective wall, the total storage space required for the roof portion and the protective wall is no larger than in the case of a normal convertible top.

The roof portion is expediently manufactured in a light-weight construction, for example, from aluminum or from fiber composite synthetic materials. In addition to having a light transport weight, the roof portion can therefore be handled or driven more easily.

If a rollover bar arrangement exists close to the protective wall, the roof portion can be fastened on the rollover bar arrangement, which has a sufficiently stable design, in addition to being fastened on the windshield frame. The fastening on the rollover bar arrangement is even possible without problems if the rollover bar arrangement comprises two bows arranged behind the headrests of the seats. Two fastening points for the rearward side of the roof element which are spaced apart from the longitudinal center axis of the motor vehicle are expedient.

In the case of a two-seater sports car (e.g., a roadster or a speedster) the protective wall is preferably arranged in a transverse plane of the vehicle extending directly behind the rearward window edges of the side windows. As a result, the protective wall can be constructed as a single straight and largely planar window.

In order to simplify opening of the roof, movement of the roof part can be controlled by a guiding linkage. When the top is closed, the guiding linkage is covered largely by the closed rear lid or trunk lid. An almost completely hidden laying of a pair of guiding linkages can be arranged below assigned elevations and indentations of the rear lid.

The protective wall can preferably be displaced independently of the roof portion into an inoperative position. In the case of a largely planar window as the protective wall, a window guidance can be provided similar to that customary for lowerable side windows of doors and the like.

Other objects, advantages and novel features of the present invention will become apparent from the following detailed description of the invention when considered in conjunction with the accompanying drawings.

DETAILED DESCRIPTION OF THE DRAWINGS

Figure 1:
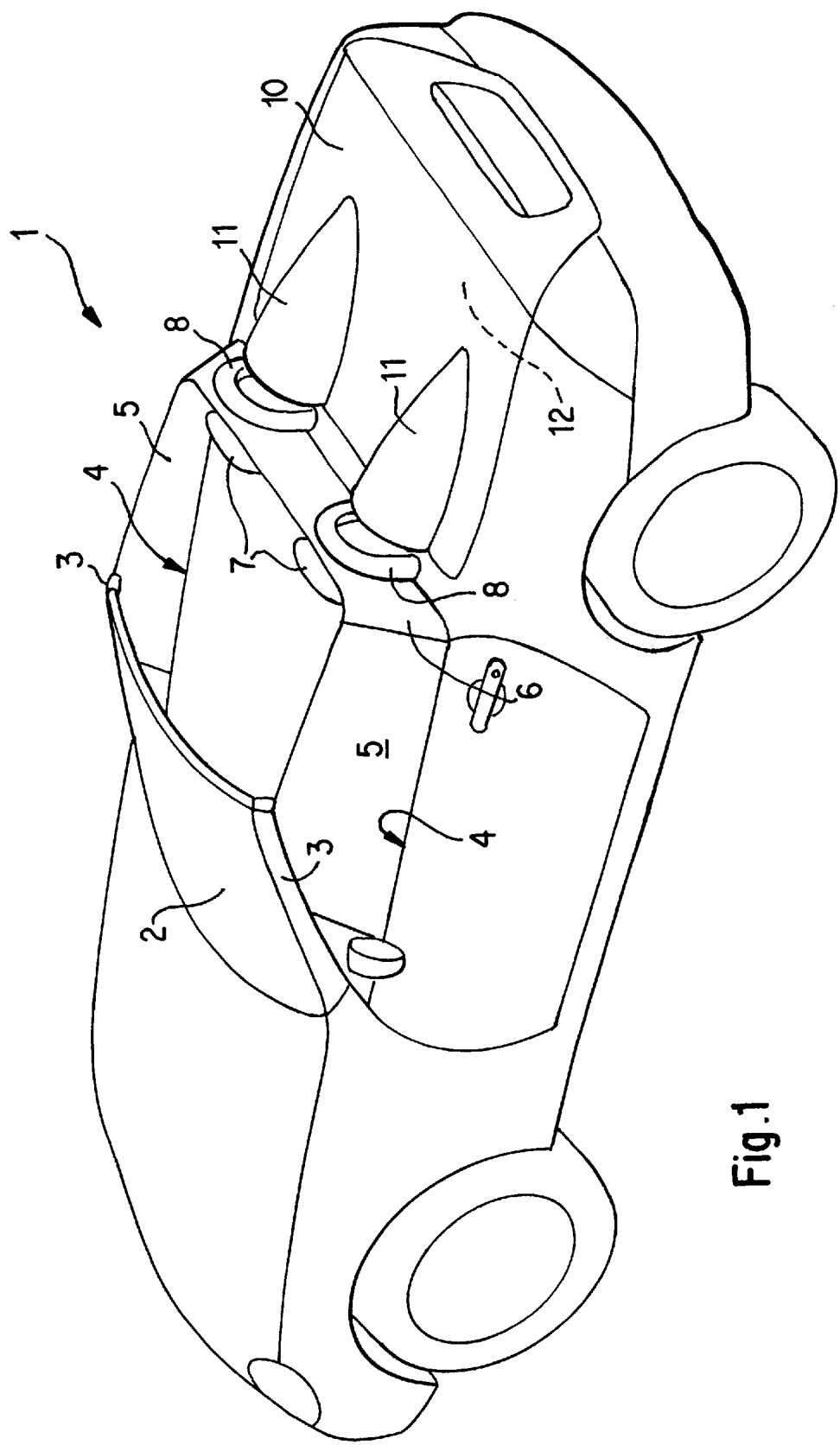
FIG. 1 is a perspective diagonal view of a motor vehicle with an opened roof and a shielding protective wall.

A sports car illustrated in FIG. 1 is constructed as a speedster 1 and therefore, in comparison to a roadster, has a correspondingly shortened windshield 2. However, the present invention could also be implemented in the same manner in the case of a roadster and in a modified form in the case of a convertible. The windshield 2 is laterally bounded by the two A-columns 3 which are connected to one another by a frame along the upper and lower edge of the windshield 2.

Behind the frame of the windshield 2, the interior or occupant space of the speedster 1 is bordered above the upper edges 4 of the side doors around its circumference by a transparent glass band. Adjoining the A-columns 3, this glass band consists of the frameless side windows 5 of the side doors which, for a complete opening, can be retracted in the corresponding door, and of a protective wall 6 made of mineral glass or plastic which adjoins the rearward edge sides of the side windows.

The protective wall 6 extends along the entire interior width behind the seat area. The protective wall 6 projects out of the vehicle body and extends behind the headrests 7 and in front of two rollover bars 8 each arranged behind the headrests. While the protective wall 6 is an approximately planar window pane in its center area, viewed from above, lateral edge sides of the protective wall 6 are curved slightly diagonally toward the front. The diagonally curved lateral narrow edge sides of the protective wall 6 are situated directly behind the rear edge sides of the corresponding side windows 5 when the side windows 5 are closed.

In the case of a larger occupant space, for example, in the case of a four-seater convertible, it is possible to insert lowerable side windows between the lateral door windows and the lateral narrow sides of the protective wall in order to achieve the desired appearance of a surrounding glass band.

Independently of the lateral length of the glass band, it is important for the shielding function of the protective wall 6 that its upper edge side is arranged at a distance below the upper edge of the windshield frame. As a result, the protective wall 6 does not act as a catch for the air stream flow. In order to nevertheless achieve a step-free appearance of the glass band, the upper narrow sides of the side windows 5 slope down, while extending diagonally, from the upper edge of the windshield frame to the upper edge of the protective wall.

The protective wall 6 moves either directly, by means of its lateral edges or by means of angle profiles fastened on one of its broad sides, in slide guides which are not shown. The slide guides have a U-shaped cross-section that is coordinated with the engaging cross-section of the lateral edges or of the angle profiles. This creates a lowering guide which permits a complete lowering of the protective wall 6 into the vehicle body.

The protective wall 6 can preferably be moved by means of a window lifting mechanism, as known from automatic window lifting mechanisms, and can be provided with a electric-motor drive for remote control by a keying device.

Figure 2:
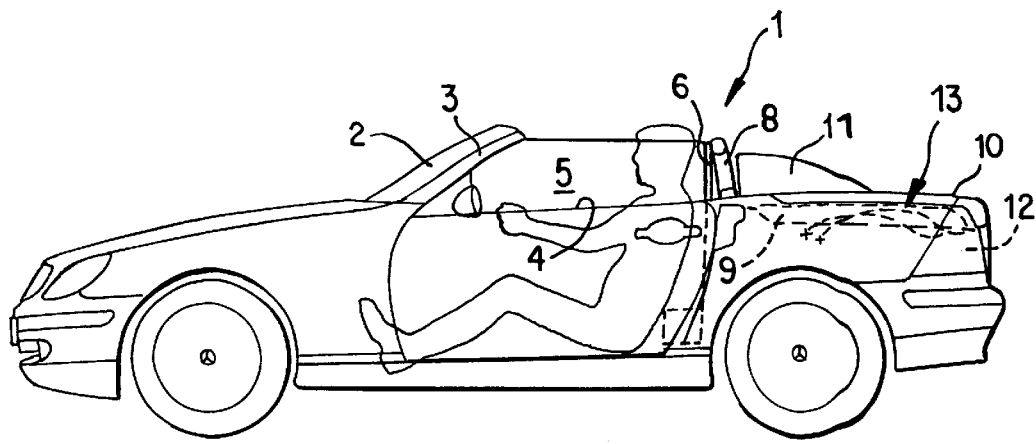
FIG. 2 is a lateral view of the motor vehicle according to FIG. 1.

As the result of a complete lowering of the protective wall 6 and of the side windows 5, the speedster 1 can be driven in an open condition without any kind of shielding. As required, the speedster 1 can be brought into its shielded and largely open position by a simple moving-up of the side windows 5 and of the protective wall 6, as illustrated in FIGS. 1 and 2.

A sun protection position is also conceivable in which the roof portion 9 is closed and the side panes 5 as well as the protective wall 6 are retracted.

Instead of being closed by means of a makeshift covering of a spray-ceiling or the like, the interior of the speedster 1 can be closed by a high-quality top. For this purpose, a roof part 9 is provided that is constructed as a firm roof shell and that is adapted to the opening interior bounded by the upper windshield frame, the side windows 5 and the protective wall 6.

Figure 3:
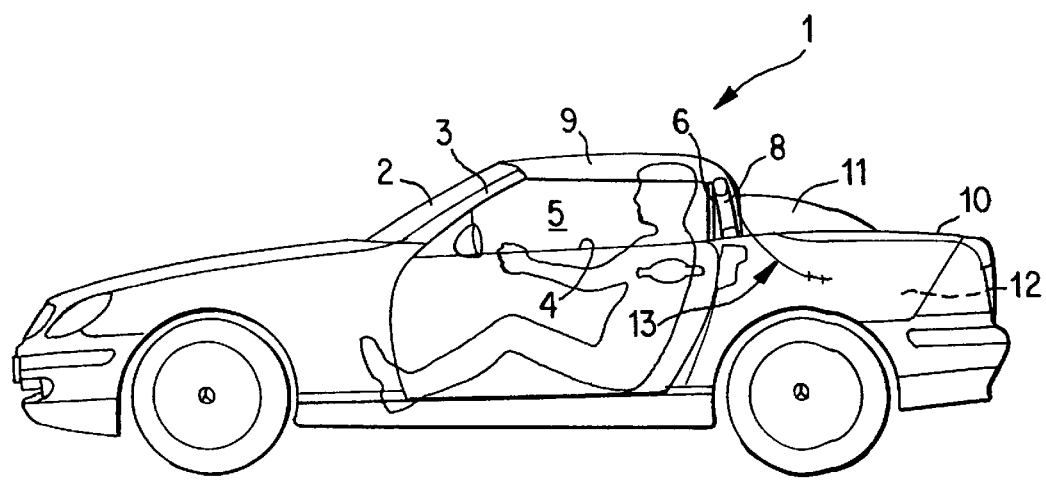
FIG. 3 is a lateral view of the motor vehicle when the top is completely closed.

In the closed position according to FIG. 3, the roof part 9 is locked in the front by two rotary catch locks of a conventional construction (not shown) to the frame profile of the windshield 2. In the rear, the roof part 9 is held by two locks (not shown) which have a lateral distance from one another and which each comprise a bottom lock part and a top lock part. The bottom parts of the rearward locks are each integrated in the center in the hollow profile of a corresponding rollover bar 8 and are thus not easily visible when the top is open. Since the roof part 9 protrudes toward the rear with respect to the protective wall 6, the two rollover bars 8 are still covered by the roof part 9. The top parts of the locks assigned to the bottom parts are integrated in the protruding length section of the roof part 9. When the roof is closed, the top parts of the locks are also not visible from the outside.

Because of the rearward protrusion of the roof part 9, this protruding length section ends on the rear edge of the rollover bars 8. The rollover bars consist of tubes which are bent in an approximately semicircular manner. The rollover bars 8, together with the protective wall 6, provide the appearance of a rear wall part to the roof part 9, and thus of a cohesive top.

The sporty appearance of the speedster 1 is further enhanced by two raised follower bodies 11 arranged on a rear lid 10 of the vehicle. The follower bodies 11, which have approximately the shape of an air scoop, each extend to behind a corresponding rollover bar 8 towards the front edge of the rear lid 10 and have a round cross-sectional contour. Starting from their forward end, the follower bodies 11 taper as streamlined bodies toward the rear of the vehicle, in which case they extend into the rearward longitudinal area of the rear lid. In this case, the follower bodies 11 consist of the an arched covering of the rear lid 10 itself.

The rear lid 10 covers a rear storage space 12 in which the roof part 9 can be deposited for driving in an open condition. For this purpose, after having been unlocked, the rear lid 10 is folded up toward the rear about an approximately horizontal transverse vehicle axis which extends in the area of the rear bumper, after which the roof part 9 can easily be lowered from above into the rear storage space 12.

For improving the operating comfort when depositing and raising roof part 9, roof part 9 is guided during the displacement, for example, by two lateral control arm pairs 13 that are linked as a mirror-symmetrical parallelogram linkage at one end to fixing points in the rear storage space 12 and, at their opposite end, in the protruding area on roof part 9. Since the control arm pairs 13 each extend in the area of the assigned follower body 11 out of the rear storage space, when the rear lid 10 is closed, they are largely covered by the assigned follower body 11.

As an alternative, the roof part 9 can also be guided by individual control arms or lever arms which are rigidly connected with the rear edge of the roof part 9 and, in the area of the assigned follower body, are rotatably disposed outside the rear space on a simple hinge. This results in depositing the roof part in the vehicle rear in a reverse arrangement (i.e., a turned position) in which the top side of the deposited roof part would be disposed on the bottom. The depositing of the roof can thus be achieved by a simple rotating movement. This alternative embodiment has the advantage that the control arms or lever arms penetrate the sealing device between the rear lid and the rear space only when the vehicle roof is open and thus may impair the sealing effect. Since such vehicles are normally driven with an open roof only in dry weather, no reliable sealing of the rear lid must exist in these phases.

It is understood that, as required, the roof part 9 can also be used as a sun protection roof, in which case the side windows 5 and/or the protective wall 6 can be opened up for the intensive venting of the interior.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a windshield;
   two side windows operatively connected to the windshield;
   at least one seat having a headrest;
   a protective, imperforate, one-piece wall that adjoins the two side windows, wherein an interior of the motor vehicle is bounded by the windshield, the side windows and the protective wall; and
   a detachably fastenable roof part for closing the interior;
   further comprising a rollover bar system, wherein the roof part is fastenable on the windshield and on the rollover bar system.

2. A motor vehicle according to claim 1, wherein the roof part is a solid roof shell.

3. A motor vehicle according to claim 1, wherein the rollover bar system comprises two rollover bars that extend to an upper edge of the protective wall.

4. A motor vehicle according to claim 3, further comprising two follower bodies located behind each of the two rollover bars, each follower body having an elevation that tapers from one of the rollover bars toward the rear of the motor vehicle.

5. A motor vehicle, comprising:

a windshield;

two side windows operatively connected to the windshield;

at least one seat having a headrest;

a protective, imperforate, one-piece wall that adjoins the two side windows, wherein an interior of the motor vehicle is bounded by the windshield, the side windows and the protective wall; and a detachably fastenable roof part for closing the interior, wherein the protective wall is independently movable in a vertical direction between operative and inoperative positions.

6. A motor vehicle according to claim 5, wherein the protective wall extends in a transverse plane between the two side windows behind the at least one seat and has lateral edges that abut back edges of the two side widows.

7. A motor vehicle according to claim 6, further comprising a guiding linkage for opening and closing the roof part.

8. A motor vehicle according to claim 7, further comprising:

a rear storage space for housing the roof part in an open position; and a rear lid that covers the guiding linkage and the roof part in the open position.

9. A motor vehicle according to claim 5, further comprising guides for guiding the protective wall into the vehicle.

10. A motor vehicle according to claim 5, wherein said protective wall comprises mineral glass or plastic.

11. A motor vehicle comprising:

a windshield;

two side windows operatively connected to the windshield;

at least one seat having a headrest;

a protective, imperforate, one-piece wall that adjoins the two side windows, wherein an interior of the motor vehicle is bounded by the windshield, the side windows and the protective wall; and a detachably fastenable roof part for closing the interior, wherein top sides of the side windows slope downward from the windshield to a top edge of the protective wall.

12. A window assembly for a convertible, comprising:

two side windows; and a protective, imperforate, one-piece wall comprising a window that extends in a transverse plane behind at least one seat of the convertible, wherein the protective wall has lateral edges that adjoin back edges of the two side windows, and further comprising a windshield that is operatively connected to the two side windows, wherein top sides of the side windows slope downward from the windshield to a top edge of the protective wall.

* * * * *